(12) United States Patent
Binkai et al.

(10) Patent No.: US 10,985,845 B2
(45) Date of Patent: Apr. 20, 2021

(54) ADAPTIVE EQUALIZATION FILTER AND SIGNAL PROCESSING DEVICE

(71) Applicant: Mitsubishi Electric Corporation, Tokyo (JP)

(72) Inventors: Masashi Binkai, Tokyo (JP); Keisuke Matsuda, Tokyo (JP); Ryosuke Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/626,730

(22) PCT Filed: Aug. 28, 2017

(86) PCT No.: PCT/JP2017/030678
§ 371 (c)(1),
(2) Date: Dec. 26, 2019

(87) PCT Pub. No.: WO2019/043748
PCT Pub. Date: Mar. 7, 2019

(65) Prior Publication Data
US 2020/0119814 A1 Apr. 16, 2020

(51) Int. Cl.
*H04B 10/61* (2013.01)
*H04L 25/03* (2006.01)
(52) U.S. Cl.
CPC ....... *H04B 10/6166* (2013.01); *H04B 10/615* (2013.01); *H04B 10/6162* (2013.01); *H04L 25/03057* (2013.01); *H04L 2025/03503* (2013.01)

(58) Field of Classification Search
CPC .......................................... H04B 10/616–6166
See application file for complete search history.

(56) References Cited

U.S. PATENT DOCUMENTS

2010/0014873 A1* 1/2010 Bulow ............... H04B 10/6161
398/159
2013/0308960 A1 11/2013 Horikoshi et al.

FOREIGN PATENT DOCUMENTS

JP 2016-119641 A 6/2016
WO WO 2012/108421 A1 8/2012

OTHER PUBLICATIONS

S. Savory, "Digital filters for coherent optical receivers", Optics Express, vol. 16, No. 2, OSA, Jan. 2008 (Year: 2008).*
International Search Report issued in PCT/JP2017/030678 (PCT/ISA/210), dated Nov. 14, 2017.

* cited by examiner

*Primary Examiner* — Shi K Li
(74) *Attorney, Agent, or Firm* — Birch, Stewart, Kolasch & Birch, LLP

(57) ABSTRACT

Each of a first filter to a fourth filter is an FIR filter having one tap. Each of a fifth filter and a sixth filter is an FIR filter having less than 46 taps. As a result, it is possible to obtain an adaptive equalization filter having a smaller total number of taps than an adaptive equalization filter using an FIR filter having 24 taps as each of the first to fourth filters.

4 Claims, 3 Drawing Sheets

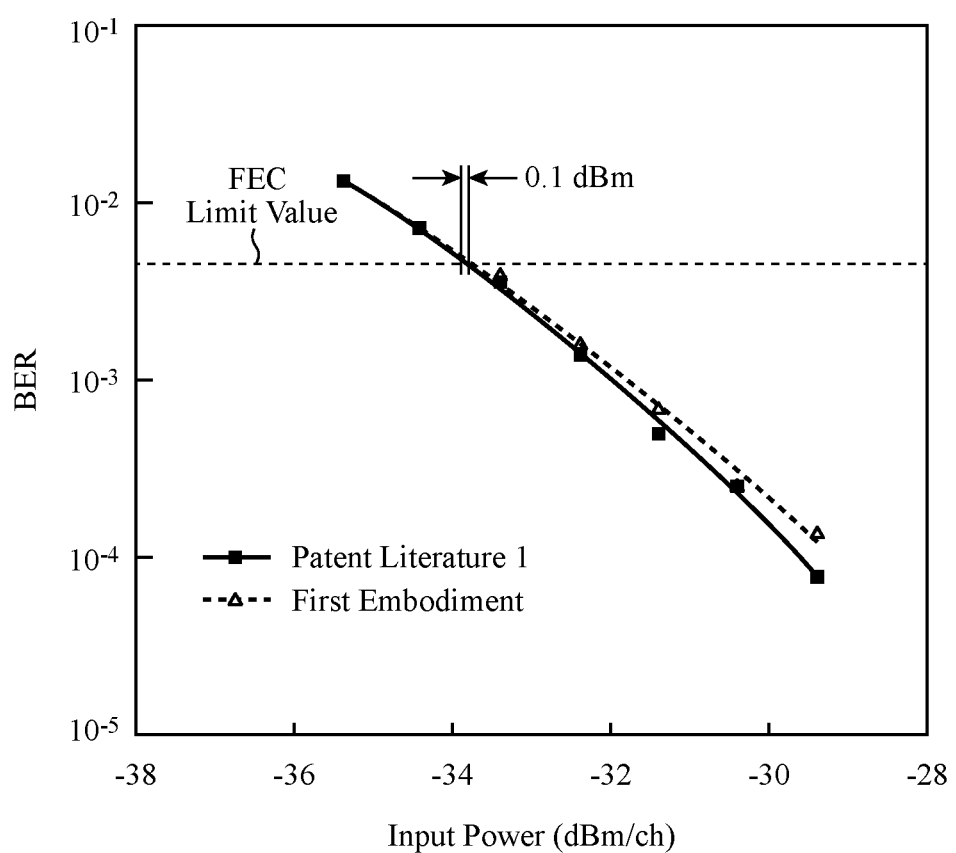

ADAPTIVE EQUALIZATION FILTER AND SIGNAL PROCESSING DEVICE

TECHNICAL FIELD

The present invention relates to an adaptive equalization filter and a signal processing device for outputting a polarization to which waveform distortion compensation is applied.

BACKGROUND ART

As a next-generation optical access system, a 100 Gb/s class passive optical network (PON) system has been studied.

In the PON system, in order to achieve a transmission capacity of 100 Gb/s class at one wavelength, it is necessary to widen a bandwidth. As a transmission method for widening a bandwidth, a coherent transmission method is known.

In the coherent transmission method, dual-polarization quadrature phase shift keying (DP-QPSK) is applied as a modulation method.

In the coherent transmission method, coherent detection of an optical signal is performed by mixing and interfering local oscillation light with an optical signal in which a first polarization $e_x$ and a second polarization $e_y$ are multiplexed when receiving the optical signal. As a result, each of the first polarization $e_x$ and the second polarization $e_y$ is extracted from the optical signal.

Next, in the coherent transmission method, the extracted first polarization $e_x$ and second polarization $e_y$ are converted from an analog signal to a digital signal, and a waveform distortion compensation process in the converted digital signal is performed.

As the waveform distortion in the digital signal, waveform distortion such as chromatic dispersion is considered. The chromatic dispersion is waveform distortion in which the pulse width of an optical signal transmitted from a transmission side device is not the same as the pulse width of an optical signal received by a reception side device.

Patent Literature 1 listed later discloses a signal processing device for performing a waveform distortion compensation process in a digital signal using an adaptive equalization filter.

In order to perform a waveform distortion compensation process in a digital signal indicating the first polarization $e_x$ and a waveform distortion compensation process in a digital signal indicating the second polarization $e_y$, the signal processing device has an adaptive equalization filter including the following four filters.

(1) A first filter for extracting a horizontal polarization component from a digital signal indicating the first polarization $e_x$ and compensating for the horizontal polarization component (2) A second filter for extracting a vertical polarization component from a digital signal indicating the first polarization $e_x$ and compensating for the vertical polarization component (3) A third filter for extracting a horizontal polarization component from a digital signal indicating the second polarization $e_y$ and compensating for the horizontal polarization component (4) A fourth filter for extracting a vertical polarization component from a digital signal indicating the second polarization $e_y$ and compensating for the vertical polarization component In addition, the signal processing device includes an adder for adding a horizontal polarization component to which compensation is applied by the first filter and a horizontal polarization component to which compensation is applied by the third filter, and outputting the addition result of the two horizontal polarization components as a horizontal component polarization $e'_x$ to which waveform distortion compensation is applied.

In addition, the signal processing device includes an adder for adding a vertical polarization component to which compensation is applied by the second filter and a vertical polarization component to which compensation is applied by the fourth filter, and outputting the addition result of the two vertical polarization components as a vertical component polarization $e'_y$ to which waveform distortion compensation is applied.

CITATION LIST

Patent Literatures

Patent Literature 1: JP 2016-119641 A

SUMMARY OF INVENTION

Technical Problem

A conventional signal processing device includes first to fourth filters, and therefore can perform a waveform distortion compensation process in the first polarization $e_x$ and a waveform distortion compensation process in the second polarization $e_y$.

However, in order to configure the first to fourth filters to be able to be applied to the first polarization $e_x$ and the second polarization $e_y$ having small input power under conditions where a bit error rate (BER) is smaller than a desired forward error correction (FEC) limit value, it is necessary to use a finite impulse response (FIR) filter having many taps as each of the first to fourth filters, that is a problem to be solved.

For example, in a case where the FEC limit value is the BER of $2.0 \times 10^{-2}$, in order to configure the first to fourth filters to be able to be applied to the first polarization $e_x$ and the second polarization $e_y$ having input power of about −34 (dBm), it is required to use an FIR filter having 24 taps, for example, as each of the first to fourth filters.

When an FIR filter having 24 taps is used as each of the first to fourth filters, the total number of taps in the first to fourth filters is 96 (=24×4).

The use of an FIR filter having many taps as each of the first to fourth filters increases power consumption. For this reason, in some cases, a signal processing device cannot be applied to the PON system in which power consumption is severely limited.

The present invention has been achieved in order to solve the above-described problems, and an object of the present invention is to obtain an adaptive equalization filter having a smaller total number of taps than an adaptive equalization filter using a finite impulse response filter having 24 taps as each of the first to fourth filters.

Further, another object of the present invention is to obtain a signal processing device capable of reducing power consumption as compared with a signal processing device having an adaptive equalization filter using a finite impulse response filter having 24 taps as each of the first to fourth filters.

Solution to Problem

The adaptive equalization filter according to the present invention includes: a first filter extracting a horizontal polarization component from a first polarization; a second filter extracting a vertical polarization component from the first polarization; a third filter extracting a horizontal polarization component from a second polarization; a fourth filter extracting a vertical polarization component from the second polarization; a fifth filter receiving a horizontal polarization component extracted by the first filter and a horizontal polarization component extracted by the third filter, and outputting a horizontal polarization component to which waveform distortion compensation is applied; and a sixth filter receiving a vertical polarization component extracted by the second filter and a vertical polarization component extracted by the fourth filter, and outputting a vertical polarization component to which waveform distortion compensation is applied. Each of the first to fourth filters is a finite impulse response filter having one tap. Each of the fifth and sixth filters is a finite impulse response filter having less than 46 taps. Each of filter coefficients in the first to sixth filters is updated on a basis of constant modulus algorithm.

Advantageous Effects of Invention

According to the present invention, each of the first to fourth filters is a finite impulse response filter having one tap, and each of the fifth and sixth filters is a finite impulse response filter having less than 46 taps. Therefore, the total number of taps can be reduced as compared with an adaptive equalization filter using a finite impulse response filter having 24 taps as each of the first to fourth filters.

BRIEF DESCRIPTION OF DRAWINGS

FIG. 5 is an explanatory diagram illustrating a result of simulating a relationship between BER and input power of a first polarization $E_{H,in}$ and a second polarization $E_{V,in}$ multiplexed in an optical signal.

DESCRIPTION OF EMBODIMENTS

Hereinafter, in order to describe the present invention in more detail, an embodiment for carrying out the present invention will be described with reference to the accompanying drawings.

First Embodiment

Figure 1:
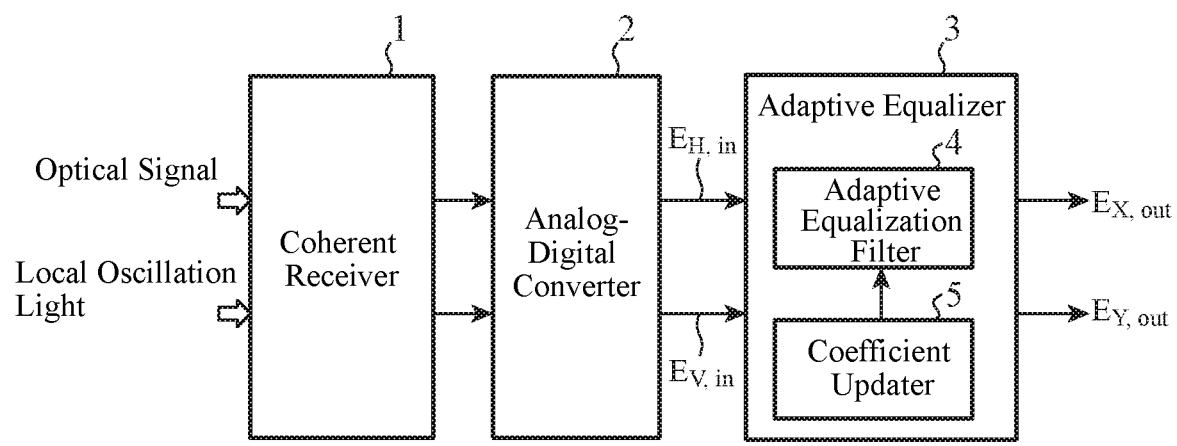
FIG. 1 is a configuration diagram illustrating a signal processing device according to a first embodiment of the present invention.

FIG. 1 is a configuration diagram illustrating a signal processing device according to a first embodiment of the present invention.

In FIG. 1, a coherent receiver 1 performs coherent detection of an optical signal in which a first polarization $E_{H,in}$ and a second polarization $E_{V,in}$ are multiplexed using local oscillation light, and thereby extracts each of the first polarization $E_{H,in}$ and the second polarization $E_{V,in}$ from the optical signal.

The local oscillation light has the same wavelength as the optical signal in which the first polarization $E_{H,in}$ and the second polarization $E_{V,in}$ are multiplexed.

In the coherent receiver 1, since it is difficult to completely separate a signal into a horizontal polarization component and a vertical polarization component, the first polarization $E_{H,in}$ extracted by the coherent receiver 1 includes a vertical polarization component in addition to a horizontal polarization component.

Further, the second polarization $E_{V,in}$ extracted by the coherent receiver 1 includes a horizontal polarization component in addition to a vertical polarization component.

The coherent receiver 1 outputs each of the extracted first polarization $E_{H,in}$ and second polarization $E_{V,in}$ to an analog-digital converter 2.

The analog-digital converter 2 converts each of the first polarization and the second polarization output from the coherent receiver 1 from an analog signal to a digital signal, and outputs the digital signal indicating the first polarization $E_{H,in}$ and the digital signal indicating the second polarization $E_{V,in}$ to an adaptive equalizer 3.

The adaptive equalizer 3 includes an adaptive equalization filter 4 and a coefficient updater 5.

Figure 2:
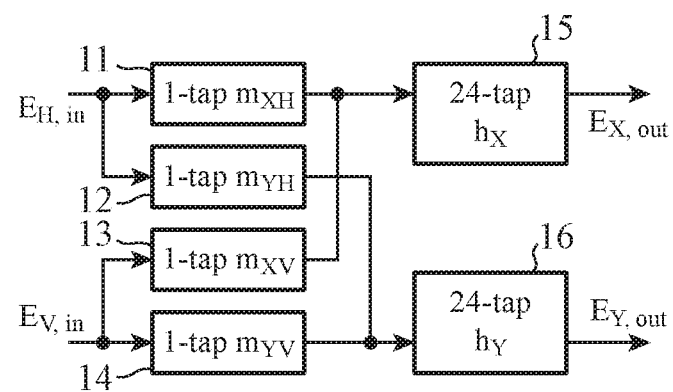
FIG. 2 is a configuration diagram illustrating an adaptive equalization filter 4 according to the first embodiment of the present invention.

The adaptive equalization filter 4 is a digital filter including a first filter 11 to a sixth filter 16 as illustrated in FIG. 2.

The adaptive equalization filter 4 compensates for waveform distortion in the digital signal indicating the first polarization $E_{H,in}$ output from the analog-digital converter 2 and waveform distortion in the digital signal indicating the second polarization $E_{V,in}$ output from the analog-digital converter 2.

The adaptive equalization filter 4 outputs each of a horizontal polarization component $E_{X,out}$ to which waveform distortion compensation is applied and a vertical polarization component $E_{Y,out}$ to which waveform distortion compensation is applied.

The coefficient updater 5 is implemented by an arithmetic processing circuit, for example.

The coefficient updater 5 performs a process of updating each of first to sixth filter coefficients in the adaptive equalization filter 4 on the basis of constant modulus algorithm (CMA).

FIG. 2 is a configuration diagram illustrating the adaptive equalization filter 4 according to the first embodiment of the present invention.

In FIG. 2, the first filter 11 is a finite impulse response (FIR) filter having one tap.

The first filter 11 extracts a horizontal polarization component included in a digital signal indicating the first polarization $E_{H,in}$ output from the analog-digital converter 2, and outputs the extracted horizontal polarization component to the fifth filter 15. In FIG. 2, the first filter 11 is expressed as "1-tap $m_{XH}$".

The second filter 12 is an FIR filter having one tap.

The second filter 12 extracts a vertical polarization component included in a digital signal indicating the first polarization $E_{H,in}$ output from the analog-digital converter 2, and outputs the extracted vertical polarization component to the sixth filter 16. In FIG. 2, the second filter 12 is expressed as "1-tap $m_{YH}$".

The third filter 13 is an FIR filter having one tap.

The third filter 13 extracts a horizontal polarization component included in a digital signal indicating the second polarization $E_{V,in}$ output from the analog-digital converter 2, and outputs the extracted horizontal polarization component to the fifth filter 15. In FIG. 2, the third filter 13 is represented as "1-tap $m_{XV}$".

The fourth filter 14 is an FIR filter having one tap.

The fourth filter 14 extracts a vertical polarization component included in a digital signal indicating the second polarization $E_{V,in}$ output from the analog-digital converter 2, and outputs the extracted vertical polarization component to the sixth filter 16. In FIG. 2, the fourth filter 14 is represented as "1-tap $m_{YV}$".

The fifth filter 15 is an FIR filter having a plurality of taps. In the first embodiment, the fifth filter 15 has 24 taps.

The fifth filter 15 receives a horizontal polarization component output from the first filter 11 and a horizontal polarization component output from the third filter 13, and outputs a horizontal polarization component $E_{X,out}$ to which waveform distortion compensation is applied.

In FIG. 2, the fifth filter 15 is expressed as "24-tap $h_X$".

The sixth filter 16 is an FIR filter having a plurality of taps. In the first embodiment, the sixth filter 16 has 24 taps.

The sixth filter 16 receives a vertical polarization component output from the second filter 12 and a vertical polarization component output from the fourth filter 14, and outputs a vertical polarization component $E_{Y,out}$ to which waveform distortion compensation is applied.

In FIG. 2, the sixth filter 16 is expressed as "24-tap $h_Y$".

FIG. 3 is a configuration diagram illustrating an FIR filter having one tap.

Figure 3A:
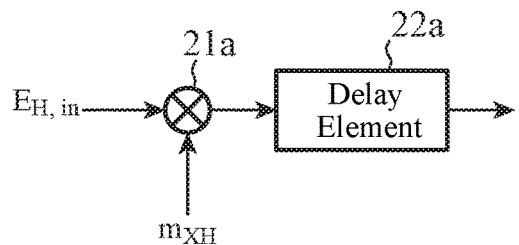
FIG. 3A is a configuration diagram illustrating a first filter 11.
Figure 3B:
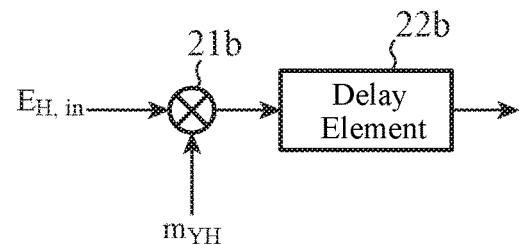
FIG. 3B is a configuration diagram illustrating a second filter 12.

FIG. 3A is a configuration diagram illustrating the first filter 11, and FIG. 3B is a configuration diagram illustrating the second filter 12.

Figure 3C:
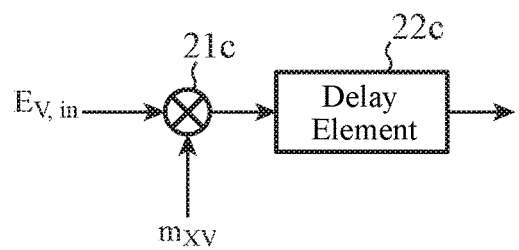
FIG. 3C is a configuration diagram illustrating a third filter 13.

FIG. 3C is a configuration diagram illustrating the third filter 13, and FIG. 3l) is a configuration diagram illustrating the fourth filter 14.

In FIG. 3A, a multiplier 21a multiplies a digital signal indicating the first polarization $E_{H,in}$ output from the analog-digital converter 2 by a filter coefficient $m_{XH}$ of the first filter 11 output from the coefficient updater 5, and outputs the digital signal $E_{H,in} \times m_{XH}$ multiplied by the filter coefficient $m_{XH}$ to a delay element 22a.

The delay element 22a delays the digital signal $E_{H,in} \times m_{XH}$ output from the multiplier 21a by one sampling time, and outputs the delayed digital signal $E_{H,in} \times m_{XH}$ to the fifth filter 15 as a horizontal polarization component included in the digital signal indicating the first polarization $E_{H,in}$.

In FIG. 3B, a multiplier 21b multiplies a digital signal indicating the first polarization $E_{H,in}$ output from the analog-digital converter 2 by a filter coefficient $m_{YH}$ of the second filter 12 output from the coefficient updater 5, and outputs the digital signal $E_{H,in} \times m_{YH}$ multiplied by the filter coefficient $m_{YH}$ to a delay element 22b.

The delay element 22b delays the digital signal $E_{H,in} \times m_{YH}$ output from the multiplier 21b by one sampling time, and outputs the delayed digital signal $E_{H,in} \times m_{YH}$ to the sixth filter 16 as a vertical polarization component included in the digital signal indicating the first polarization $E_{H,in}$.

In FIG. 3C, a multiplier 21c multiplies a digital signal indicating the second polarization output from the analog-digital converter 2 by a filter coefficient $m_{XV}$ of the third filter 13 output from the coefficient updater 5, and outputs the digital signal $E_{V,in} \times m_{XV}$ multiplied by the filter coefficient $m_{XV}$ to a delay element 22c.

The delay element 22c delays the digital signal $E_{V,in} \times m_{XV}$ output from the multiplier 21c by one sampling time, and outputs the delayed digital signal $E_{V,in} \times m_{XV}$ to the fifth filter 15 as a horizontal polarization component included in the digital signal indicating the second polarization $E_{V,in}$.

Figure 3D:
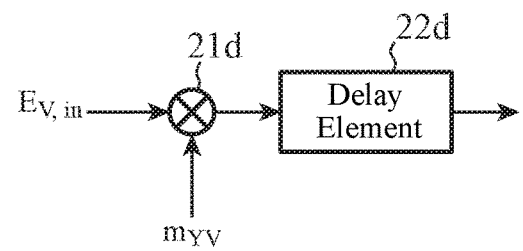
FIG. 3D is a configuration diagram illustrating a fourth filter 14.

In FIG. 3D, a multiplier 21d multiplies a digital signal indicating the second polarization $E_{V,in}$ output from the analog-digital converter 2 by a filter coefficient $m_{YV}$ of the fourth filter 14 output from the coefficient updater 5, and outputs the digital signal $E_{V,in} \times m_{YV}$ multiplied by the filter coefficient $m_{YV}$ to a delay element 22d.

The delay element 22d delays the digital signal $E_{V,in} \times m_{YV}$ output from the multiplier 21d by one sampling time, and outputs the delayed digital signal $E_{V,in} \times m_{YV}$ to the sixth filter 16 as a vertical polarization component included in the digital signal indicating the second polarization $E_{V,in}$.

FIG. 4 is a configuration diagram illustrating an FIR filter having 24 taps.

Figure 4A:
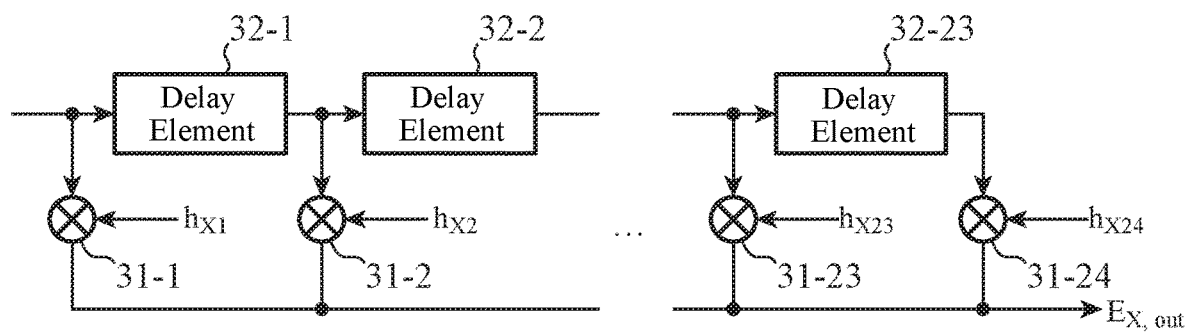
FIG. 4A is a configuration diagram illustrating a fifth filter 15.
Figure 4B:
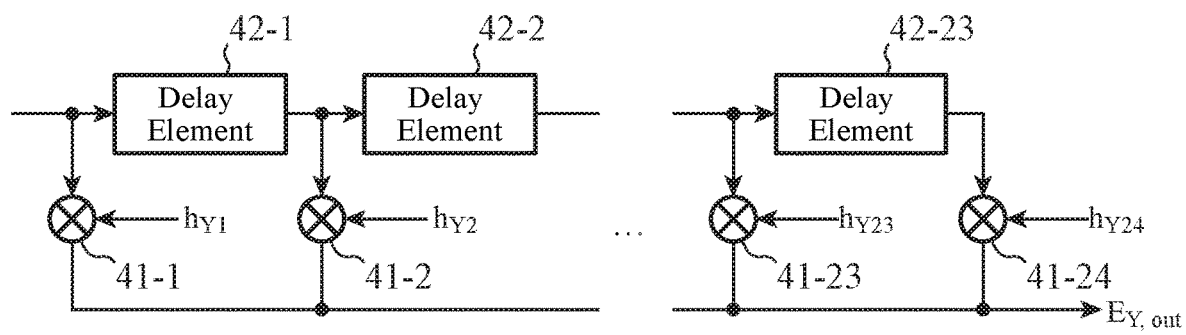
FIG. 4B is a configuration diagram illustrating a sixth filter 16.

FIG. 4A is a configuration diagram illustrating the fifth filter 15, and FIG. 4B is a configuration diagram illustrating the sixth filter 16.

In FIG. 4A, a multiplier 31-1 receives the digital signal $E_{H,in} \times m_{XH}$ output from the delay element 22a of the first filter 11 and the digital signal $E_{V,in} \times m_{XV}$ output from the delay element 22c of the third filter 13.

The multiplier 31-1 multiplies an addition signal ($E_{H,in} \times m_{XH} + E_{V,in} \times m_{XV}$) which is the sum of the input digital signals $E_{H,in} \times m_{XH}$ and $E_{V,in} \times m_{XV}$ by the filter coefficient $h_{X1}$ output from the coefficient updater 5, and outputs the addition signal multiplied by the filter coefficient $h_{X1}$.

Similarly to the multiplier 31-1, the delay element 32-1 receives the digital signal $E_{H,in} \times m_{XH}$ output from the delay element 22a of the first filter 11 and the digital signal $E_{V,in} \times m_{XV}$ output from the delay element 22c of the third filter 13.

The delay element 32-1 delays the addition signal ($E_{H,in} \times m_{XH} + E_{V,in} \times m_{XV}$) which is the sum of the input digital signals $E_{H,in} \times m_{XH}$ and $E_{V,in} \times m_{XV}$ by one sampling time.

A multiplier 31-$n$ ($n=2, 3, \ldots, 24$) multiplies the addition signal, which is delayed by one sampling time by a delay element 32-($n$−1), by the filter coefficient $h_{Xn}$, and outputs the addition signal multiplied by the filter coefficient $h_{Xn}$.

A delay element 32-$n$ ($n=2, 3, \ldots, 23$) delays the output signal of a delay element 32-($n$−1) by one sampling time.

The sum of the output signals of the multipliers 31-1 to 31-24 is output as a horizontal polarization component $E_{X,out}$ to which waveform distortion compensation is applied.

In FIG. 4B, a multiplier 41-1 receives the digital signal $E_{H,in} \times m_{YH}$ output from the delay element 22b of the second filter 12 and the digital signal $E_{V,in} \times m_{YV}$ output from the delay element 22d of the fourth filter 14.

The multiplier 41-1 multiplies an addition signal ($E_{H,in} \times m_{YH} + E_{V,in} \times m_{YV}$) which is the sum of the input digital signals $E_{H,in} \times m_{YH}$ and $E_{V,in} \times m_{YV}$ by the filter coefficient $h_{Y1}$ output from the coefficient updater 5, and outputs the addition signal multiplied by the filter coefficient $h_{Y1}$.

Similarly to the multiplier 41-1, a delay element 42-1 receives the digital signal $E_{H,in} \times m_{YH}$ output from the delay element 22b of the second filter 12 and the digital signal $E_{V,in} \times m_{YV}$ output from the delay element 22d of the fourth filter 14.

The delay element 42-1 delays the addition signal ($E_{H,in} \times m_{YH} + E_{V,in} \times m_{YV}$) which is the sum of the input digital signals $E_{H,in} \times m_{YH}$ and $E_{V,in} \times m_{YV}$ by one sampling time.

A multiplier 41-$n$ ($n$=2, 3, ..., 24) multiplies the addition signal, which is delayed by one sampling time by a delay element 42-($n$−1), by the filter coefficient $h_{Yn}$, and outputs the addition signal multiplied by the filter coefficient $h_{Yn}$.

A delay element 42-$n$ ($n$=2, 3, ..., 23) delays the output signal of a delay element 42-($n$−1) by one sampling time.

The sum of the output signals of the multipliers 41-1 to 41-24 is output as the vertical polarization component $E_{Y,out}$ to which waveform distortion compensation is applied.

Next, operation will be described.

When receiving an optical signal in which the first polarization $E_{H,in}$ and the second polarization $E_{V,in}$ are multiplexed, the coherent receiver 1 performs coherent detection of the optical signal using local oscillation light, thus extracting each of the first polarization $E_{H,in}$ and the second polarization $E_{V,in}$ from the optical signal. The local oscillation light has the same wavelength as the optical signal.

The coherent receiver 1 outputs each of the extracted first polarization $E_{H,in}$ and second polarization $E_{V,in}$ to an analog-digital converter 2.

The analog-digital converter 2 converts each of the first polarization $E_{H,in}$ and the second polarization $E_{V,in}$ output from the coherent receiver 1 from an analog signal to a digital signal.

The analog-digital converter 2 outputs the digital signal indicating the converted first polarization $E_{H,in}$ and the digital signal indicating the converted second polarization $E_{V,in}$ to the adaptive equalizer 3.

The adaptive equalization filter 4 of the adaptive equalizer 3 compensates for waveform distortion in the digital signal indicating the first polarization $E_{H,in}$ output from the analog-digital converter 2 and waveform distortion in the digital signal indicating the second polarization $E_{V,in}$ output from the analog-digital converter 2.

The adaptive equalization filter 4 outputs each of a horizontal polarization component $E_{X,out}$ to which waveform distortion compensation is applied and a vertical polarization component $E_{Y,out}$ to which waveform distortion compensation is applied.

Hereinafter, operation of the adaptive equalizer 3 will be specifically described.

The first filter 11 in the adaptive equalization filter 4 of the adaptive equalizer 3 extracts a horizontal polarization component included in the digital signal indicating the first polarization $E_{H,in}$ output from the analog-digital converter 2. The first filter 11 outputs the extracted horizontal polarization component to the fifth filter 15.

Specifically, the multiplier 21$a$ of the first filter 11 multiplies the digital signal indicating the first polarization $E_{H,in}$ output from the analog-digital converter 2 by the filter coefficient $m_{XH}$ output from the coefficient updater 5, and outputs the digital signal $E_{H,in} \times m_{XH}$ multiplied by the filter coefficient $m_{XH}$ to the delay element 22$a$.

The delay element 22$a$ of the first filter 11 delays the digital signal $E_{H,in} \times m_{XH}$ output from the multiplier 21$a$ by one sampling time, and outputs the delayed digital signal $E_{H,in} \times m_{XH}$ to the fifth filter 15 as a horizontal polarization component included in the digital signal indicating the first polarization $E_{H,in}$.

The second filter 12 in the adaptive equalization filter 4 of the adaptive equalizer 3 extracts a vertical polarization component included in the digital signal indicating the first polarization $E_{H,in}$ output from the analog-digital converter 2. The second filter 12 outputs the extracted vertical polarization component to the sixth filter 16.

Specifically, the multiplier 21$b$ of the second filter 12 multiplies a digital signal indicating the first polarization $E_{H,in}$ output from the analog-digital converter 2 by the filter coefficient $m_{YH}$ output from the coefficient updater 5, and outputs the digital signal $E_{H,in} \times m_{YH}$ multiplied by the filter coefficient $m_{YH}$ to the delay element 22$b$.

The delay element 22$b$ of the second filter 12 delays the digital signal $E_{H,in} \times m_{YH}$ output from the multiplier 21$b$ by one sampling time, and outputs the delayed digital signal $E_{H,in} \times m_{YH}$ to the sixth filter 16 as a vertical polarization component included in the digital signal indicating the first polarization $E_{H,in}$.

The third filter 13 in the adaptive equalization filter 4 of the adaptive equalizer 3 extracts a horizontal polarization component included in the digital signal indicating the second polarization $E_{V,in}$ output from the analog-digital converter 2. The third filter 13 outputs the extracted horizontal polarization component to the fifth filter 15.

Specifically, the multiplier 21$c$ of the third filter 13 multiplies the digital signal indicating the second polarization $E_{V,in}$ output from the analog-digital converter 2 by the filter coefficient $m_{XV}$ output from the coefficient updater 5, and outputs the digital signal $E_{V,in} \times m_{XV}$ multiplied by the filter coefficient $m_{XV}$ to the delay element 22$c$.

The delay element 22$c$ of the third filter 13 delays the digital signal $E_{V,in} \times m_{XV}$ output from the multiplier 21$c$ by one sampling time, and outputs the delayed digital signal $E_{V,in} \times m_{XV}$ to the fifth filter 15 as a horizontal polarization component included in the digital signal indicating the second polarization $E_{V,in}$.

The fourth filter 14 in the adaptive equalization filter 4 of the adaptive equalizer 3 extracts a vertical polarization component included in the digital signal indicating the second polarization $E_{V,in}$ output from the analog-digital converter 2. The fourth filter 14 outputs the extracted vertical polarization component to the sixth filter 16.

Specifically, the multiplier 21$d$ of the fourth filter 14 multiplies the digital signal indicating the second polarization $E_{V,in}$ output from the analog-digital converter 2 by the filter coefficient $m_{YV}$ output from the coefficient updater 5, and outputs the digital signal $E_{V,in} \times m_{YV}$ multiplied by the filter coefficient $m_{YV}$ to the delay element 22$d$.

The delay element 22$d$ of the fourth filter 14 delays the digital signal $E_{V,in} \times m_{YV}$ output from the multiplier 21$d$ by one sampling time, and outputs the delayed digital signal $E_{V,in} \times m_{YV}$ to the sixth filter 16 as a vertical polarization component included in the digital signal indicating the second polarization $E_{V,in}$.

The fifth filter 15 receives a horizontal polarization component output from the first filter 11 and a horizontal polarization component output from the third filter 13, and outputs a horizontal polarization component $E_{X,out}$ to which waveform distortion compensation is applied.

The fifth filter 15 compensates for waveform distortion in the digital signal indicating the first polarization $E_{H,in}$, and outputs the horizontal polarization component $E_{X,out}$ to which waveform distortion compensation is applied.

Hereinafter, operation of the fifth filter 15 will be specifically described.

When ($E_{H,in} \times m_{XH} + E_{V,in} \times m_{XV}$), which is an addition signal of the output signal of the first filter 11 and the output signal of the third filter 13, is input to the multiplier 31-1 of the fifth filter 15, the multiplier 31-1 multiplies the input addition signal by the filter coefficient $h_{X1}$ output from the coefficient updater 5, and outputs the addition signal multiplied by the filter coefficient $h_{X1}$.

The delay element 32-1 of the fifth filter 15 delays the addition signal of the output signal of the first filter 11 and the output signal of the third filter 13 by one sampling time.

The multiplier 31-$n$ ($n$=2, 3, . . . , 24) of the fifth filter 15 multiplies the addition signal, which is delayed by one sampling time by the delay element 32-($n$−1), by the filter coefficient $h_{Xn}$ output from the coefficient updater 5, and outputs the addition signal multiplied by the filter coefficient $h_{Xn}$.

The delay element 32-$n$ ($n$=2, 3, . . . , 23) of the fifth filter 15 delays the output signal of the delay element 32-($n$−1) by one sampling time.

The sum of the output signals of the multipliers 31-1 to 31-24 is output from the fifth filter 15 as the horizontal polarization component $E_{X,out}$ to which waveform distortion compensation is applied.

The sixth filter 16 inputs a vertical polarization component output from the second filter 12 and a vertical polarization component output from the fourth filter 14, and outputs a vertical polarization component $E_{Y,out}$ to which waveform distortion compensation is applied.

The sixth filter 16 compensates for waveform distortion in the digital signal indicating the second polarization $E_{V,in}$, and outputs the vertical polarization component $E_{Y,out}$ to which waveform distortion compensation is applied.

Hereinafter, operation of the sixth filter 16 will be specifically described.

When ($E_{H,in} \times m_{YH} + E_{V,in} \times m_{YV}$), which is an addition signal of the output signal of the second filter 12 and the output signal of the fourth filter 14, is input to the multiplier 41-1 of the sixth filter 16, the multiplier 41-1 multiplies the input addition signal by the filter coefficient $h_{Y1}$ output from the coefficient updater 5, and outputs the addition signal multiplied by the filter coefficient $h_{Y1}$.

The delay element 42-1 of the sixth filter 16 delays the addition signal of the output signal of the second filter 12 and the output signal of the fourth filter 14 by one sampling time.

The multiplier 41-$n$ ($n$=2, 3, . . . , 24) of the sixth filter 16 multiplies the addition signal, which is delayed by one sampling time by the delay element 42-($n$−1), by the filter coefficient $h_{Yn}$ output from the coefficient updater 5, and outputs the addition signal multiplied by the filter coefficient $h_{Yn}$.

The delay element 42-$n$ ($n$=2, 3, . . . , 23) of the sixth filter 16 delays the output signal of the delay element 42-($n$−1) by one sampling time.

The sum of the output signals of the multipliers 41-1 to 41-24 is output from the sixth filter 16 as the vertical polarization component $E_{Y,out}$ to which waveform distortion compensation is applied.

The coefficient updater 5 of the adaptive equalizer 3 updates each of the filter coefficients in the first filter 11 to the sixth filter 16 on the basis of CMA.

Hereinafter, the filter coefficient update process by the coefficient updater 5 will be specifically described.

First, the coefficient updater 5 updates the filter coefficient $m_{XH}$ in the first filter 11, the filter coefficient $m_{YH}$ in the second filter 12, the filter coefficient $m_{XV}$ in the third filter 13, and the filter coefficient $m_{y}v$ in the fourth filter 14 in accordance with the following formulas (1) to (4).

$$m_{XH} \leftarrow m_{XH} + \mu \|h_X\|^* e_{X,out} E_{X,out} \bar{E}_{H,in}^* \quad (1)$$

$$m_{YH} \leftarrow m_{YH} + \mu \|h_Y\|^* e_{Y,out} E_{Y,out} \bar{E}_{H,in}^* \quad (2)$$

$$m_{XV} \leftarrow m_{XV} + \mu \|h_X\|^* e_{X,out} E_{X,out} \bar{E}_{V,in}^* \quad (3)$$

$$m_{YV} \leftarrow m_{YV} + \mu \|h_Y\|^* e_{Y,out} E_{Y,out} \bar{E}_{V,in}^* \quad (4)$$

$$h_X = h_{X1} + h_{X2} + \ldots + h_{24} \quad (5)$$

$$h_Y = h_{Y1} + h_{Y2} + \ldots + h_{Y24} \quad (6)$$

In formulas (1) to (4), $\mu$ represents an update step size. The update step size $\mu$ is determined by, for example, a laser line width of local oscillation light, and is set to a time such as 0.5 seconds.

$e_{X,out}$ represents a square amplitude error, and is expressed as $e_{Y,out} = (1 - |E_{X,out}|)^2$.

$e_{Y,out}$ represents a square amplitude error, and is expressed as $e_{Y,out} = (1 - |E_{Y,out}|)^2$.

\* is a symbol indicating complex conjugate.

$\bar{E}_{H,in}$ represents an average value of the first polarization $E_{H,in}$ in a time corresponding to the update step size $\mu$.

$\bar{E}_{V,in}$ represents an average value of the second polarization $E_{V,in}$ in a time corresponding to the update step size $\mu$.

In the text of this specification, the symbol "-" cannot be added above the letter "E" in the electronic patent application, and therefore it is expressed as "E bar".

Next, the coefficient updater 5 updates the filter coefficient $h_{Xn}$ ($n$=1, 2, . . . , 24) in the fifth filter 15 and the filter coefficient $h_{Yn}$ ($n$=1, 2, . . . , 24) in the sixth filter 16 in accordance with the following formulas (7) and (8).

$$h_{Xn} \leftarrow h_{Xn} + \mu e_{X,out} E_{X,out} (m_{XH} E_{H,in} + m_{XV} E_{V,in})^* \quad (7)$$

$$h_{Yn} \leftarrow h_{Yn} + \mu e_{Y,out} E_{Y,out} (m_{YH} E_{H,in} + m_{YV} E_{V,in})^* \quad (8)$$

In the first embodiment, the adaptive equalization filter 4 includes the first filter 11 to the fourth filter 14 each having one tap, and the fifth filter 15 and the sixth filter 16 each having 24 taps. Therefore, the total number of taps of the adaptive equalization filter 4 is 52.

The adaptive equalization filter described in Patent Literature 1 includes first to fourth filters each having 24 taps. Therefore, the total number of taps of the adaptive equalization filter described in Patent Literature 1 is 96.

Therefore, the adaptive equalization filter 4 according to the first embodiment has a smaller total number of taps than the adaptive equalization filter described in Patent Literature 1.

In the first embodiment, an example in which each of the fifth filter 15 and the sixth filter 16 has 24 taps is illustrated. However, even in another configuration, if each of the fifth filter 15 and the sixth filter 16 has less than 46 taps, the total number of taps is reduced as compared with the adaptive equalization filter described in Patent Literature 1.

Here, FIG. 5 is an explanatory diagram illustrating a result of simulating a relationship between BER and input power of the first polarization $E_{H,in}$ and the second polarization $E_{V,in}$ multiplexed in an optical signal.

In the simulation in FIG. 5, assuming that coherent technology is applied to access optical communication, a DP-QPSK signal with a transmission rate of 100 Gb/s is transmitted, and minimum receiving sensitivity of the DP-QPSK signal after 80 km transmission is measured.

In FIG. 5, the horizontal axis indicates optical power (input power) input to the coherent receiver 1 per channel, and the vertical axis indicates BER before error correction.

In FIG. 5, a forward error correction (FEC) limit value is the BER of $2.0 \times 10^{-2}$.

In the signal processing device of Patent Literature 1 including the first to fourth filters each having 24 taps, the minimum reception sensitivity satisfying the FEC limit value is about −34 dBm.

In the signal processing device including the adaptive equalization filter 4 according to the first embodiment, the minimum reception sensitivity satisfying the FEC limit value is about −33.9 dBm.

Therefore, although the adaptive equalization filter 4 according to the first embodiment has a smaller total number of taps than the adaptive equalization filter described in Patent Literature 1, the difference in the minimum reception sensitivity satisfying the FEC limit value between them is 0.1 dBm (=|34−33.9|), and it is possible for the adaptive equalization filter 4 according to the first embodiment to obtains similar reception performance to the adaptive equalization filter described in Patent Literature 1.

As apparent from the above, according to the first embodiment, each of the first filter 11 to the fourth filter 14 is an FIR filter having one tap, and each of the fifth filter 15 and the sixth filter 16 is an FIR filter having less than 46 taps. Therefore, it is possible to obtain an adaptive equalization filter having a smaller total number of taps than an adaptive equalization filter using an FIR filter having 24 taps as each of the first to fourth filters.

Therefore, according to the first embodiment, it is possible to obtain a signal processing device capable of reducing power consumption as compared with a signal processing device having an adaptive equalization filter using an FIR filter having 24 taps as each of the first to fourth filters.

Note that any component in the embodiment can be modified, or any component in the embodiment can be omitted within the scope of the present invention.

INDUSTRIAL APPLICABILITY

The present invention is suitable for an adaptive equalization filter and a signal processing device for outputting a polarization to which waveform distortion compensation is applied.

REFERENCE SIGNS LIST

1: Coherent receiver, 2: Analog-digital converter, 3: Adaptive equalizer, 4: Adaptive equalization filter, 5: Coefficient updater, 11: First filter, 12: Second filter, 13: Third filter, 14: Fourth filter, 15: Fifth filter, 16: Sixth filter. 21a, 21b, 21c, 21d: Multiplier, 22a, 22b, 22c, 22d: Delay element, 31-1 to 31-24: Multiplier, 32-1 to 32-23: Delay element, 41-1 to 41-24: Multiplier, 42-1 to 42-23: Delay element.

The invention claimed is:

1. An adaptive equalization filter comprising:
a first filter extracting a horizontal polarization component from a first polarization;
a second filter extracting a vertical polarization component from the first polarization;
a third filter extracting a horizontal polarization component from a second polarization;
a fourth filter extracting a vertical polarization component from the second polarization;
a fifth filter receiving a horizontal polarization component extracted by the first filter and a horizontal polarization component extracted by the third filter, and outputting a horizontal polarization component to which waveform distortion compensation is applied; and
a sixth filter receiving a vertical polarization component extracted by the second filter and a vertical polarization component extracted by the fourth filter, and outputting a vertical polarization component to which waveform distortion compensation is applied, wherein
each of the first to fourth filters is a finite impulse response filter having one tap, and
each of the fifth and sixth filters is a finite impulse response filter having less than 46 taps,
each of filter coefficients in the first to sixth filters is updated on a basis of constant modulus algorithm, and
the adaptive equalization filter is configured to achieve a bit error rate of substantially $2.0 \times 10^{-2}$ when the first polarization and the second polarization are extracted from an optical signal, said optical signal being configured to transmit data at a bit rate of 100 Gb/s and having an input power of substantially −34 dBm.

2. The adaptive equalization filter according to claim 1, wherein each of the fifth and sixth filters is a finite impulse response filter having 24 taps.

3. A signal processing device comprising:
a coherent receiver extracting each of a first polarization and a second polarization from an optical signal by performing coherent detection of the optical signal in which the first polarization and the second polarization are multiplexed using local oscillation light, said optical signal being configured to transmit data at a bit rate of 100 Gb/s and having an input power of substantially −34 dBm; and
an adaptive equalization filter compensating for waveform distortion in each of the first polarization and the second polarization extracted by the coherent receiver, the adaptive equalization filter being configured to achieve a bit error rate of substantially $2.0 \times 10^{-2}$, wherein
the adaptive equalization filter includes:
a first filter extracting a horizontal polarization component from the first polarization;
a second filter extracting a vertical polarization component from the first polarization;
a third filter extracting a horizontal polarization component from the second polarization;
a fourth filter extracting a vertical polarization component from the second polarization;
a fifth filter receiving a horizontal polarization component extracted by the first filter and a horizontal polarization component extracted by the third filter, and outputting a horizontal polarization component to which waveform distortion compensation is applied; and
a sixth filter receiving a vertical polarization component extracted by the second filter and a vertical polarization component extracted by the fourth filter, and outputting a vertical polarization component to which waveform distortion compensation is applied,
each of the first to fourth filters is a finite impulse response filter having one tap, and
each of the fifth and sixth filters is a finite impulse response filter having less than 46 taps, and
wherein each of filter coefficients in the first to sixth filters is updated on a basis of constant modulus algorithm.

4. The signal processing device according to claim 3, wherein each of the fifth and sixth filters is a finite impulse response filter having 24 taps.

* * * * *